United States Patent [19]

Goszyk et al.

[11] 3,983,533

[45] Sept. 28, 1976

[54] MOTOR VEHICLE FUEL ECONOMY INDICATING CIRCUIT

[75] Inventors: Kurt A. Goszyk, Westland; Richard A. Schaefer, Ann Arbor, both of Mich.

[73] Assignee: Ford Motor Company, Dearborn, Mich.

[22] Filed: June 19, 1975

[21] Appl. No.: 588,442

[52] U.S. Cl................................. 340/52 R; 340/62; 180/103 BF; 123/198 R
[51] Int. Cl.²........................................ G08B 21/00
[58] Field of Search................ 340/52 R, 52 D, 53, 340/62, 263; 307/10 R; 180/82 R, 103, 105 E; 123/32 EA, 117 R, 148 E, 198 R, 198 D

[56] References Cited
UNITED STATES PATENTS

| | | | |
|---|---|---|---|
| 2,253,425 | 8/1941 | Garland | 200/82 |
| 2,455,573 | 12/1948 | Fant, Jr. | 123/198 |
| 2,894,252 | 7/1959 | Lawhorn et al. | 340/282 |
| 3,699,935 | 10/1972 | Adler et al. | 123/102 |
| 3,757,519 | 9/1973 | Graewert | 60/286 |
| 3,909,778 | 9/1975 | Maria et al. | 340/52 R |

Primary Examiner—John W. Caldwell
Assistant Examiner—Joseph E. Nowicki
Attorney, Agent, or Firm—Robert W. Brown; Keith L. Zerschling

[57] ABSTRACT

A circuit for providing an indication to the operator of a motor vehicle that the engine or vehicle is operating under conditions likely to produce poor fuel economy. The fuel economy indicating circuit includes a first circuit for generating a first electrical signal having a magnitude proportional to the angular velocity of a component of the vehicle drive train, and a second circuit for generating a second electrical signal having a magnitude proportional to the angular acceleration of a component of the vehicle drive train. A third circuit combines the first and second electrical signals to generate a third signal having a magnitude that is a function of the magnitudes of the first and second electrical signals. An electrically actuable indicating device is controlled by a fourth circuit that is responsive to the magnitude of the third electrical signal to cause actuation of the indicating device when the third electrical signal reaches a predetermined threshold level.

14 Claims, 1 Drawing Figure

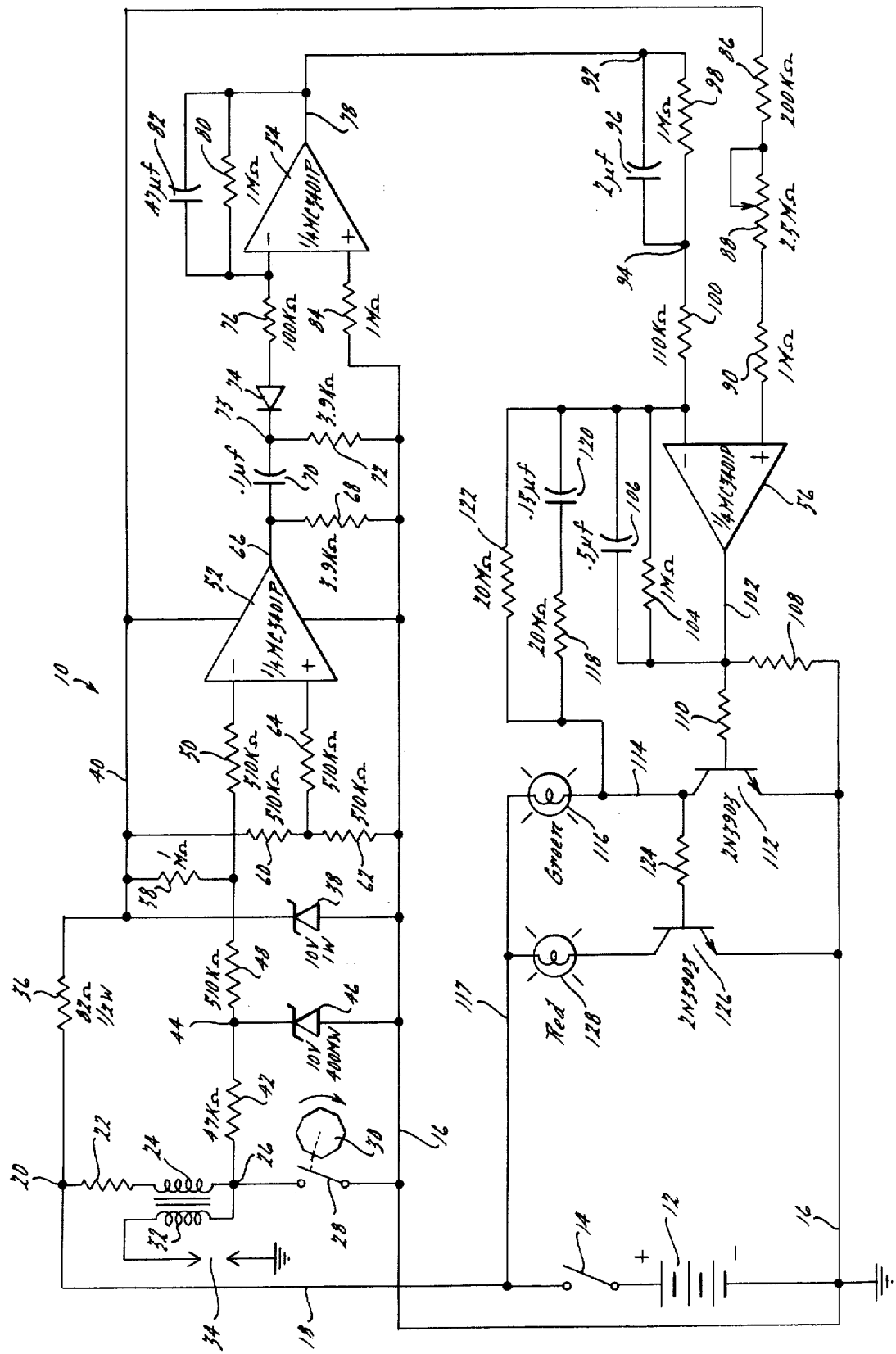

MOTOR VEHICLE FUEL ECONOMY INDICATING CIRCUIT

BACKGROUND

This invention relates to motor vehicle fuel economy indicating systems and, more particularly, to a fuel economy indicating circuit for indicating to the operator of a motor vehicle that the vehicle is operating under conditions likely to produce poor fuel economy.

Various fuel economy indicating devices have in the past been proposed for providing the vehicle operator with an indication of the likelihood of poor fuel economy being achieved. Perhaps, the earliest device utilized was a vacuum gauge located within the passenger compartment of a motor vehicle to provide the operator thereof with an indication of engine intake manifold vacuum level. Generally, the greater the manifold intake vacuum, the better the fuel economy. In this connection, manifold vacuum provides an inference of the load on the engine of the motor vehicle.

Vacuum gauges for indicating fuel economy generally have been replaced by warning light indications of manifold vacuum level. Typically, a switch controlled by manifold vacuum energizes a warning indication, such as a red light, when the vacuum level falls below a predetermined threshold, and when the vacuum level is above the threshold, a light indicative of good fuel economy, for example a green light, may be energized to indicate this condition.

SUMMARY OF THE INVENTION

It is an object of the present invention to provide a fuel economy indicating circuit for a motor vehicle.

Another object of the invention is to provide a fuel economy indicating circuit that utilizes the angular velocity and angular acceleration of one or more components in the drive train of a motor vehicle to produce signals which may be combined to provide indications of poor or good fuel economy or both.

Still another object of the invention is to provide a fuel economy indicating circuit that does not utilize manifold vacuum as a signal source, but rather which utilizes the first and second mathematical derivatives of motor vehicle drive train angular position to produce an indication of relative fuel economy being achieved by the engine of the motor vehicle.

These and other objects of the invention are achieved in a fuel economy indicating circuit which includes first circuit means for generating a first electrical signal having a magnitude proportional to the angular velocity of a component of the vehicle drive train, and second circuit means for generating a second electrical signal having a magnitude proportional to the angular acceleration of a component of the vehicle drive train. Third circuit means are provided for combining the first and second electrical signals, thereby, to generate a third electrical signal having a magnitude that is a function of the magnitudes of the first and second electrical signals. An electrically actuable indicating device, which preferably is located within the passenger compartment of the vehicle for ready observation by the vehicle operator, is controlled by fourth circuit means that is responsive to the magnitude of the third electrical signal to cause actuation of the indicating device when the third electrical signal reaches a predetermined threshold level. Preferably, the fuel economy indicating circuit includes circuit means for providing a hysteresis function to shift the predetermined threshold level from a first level, when the indicating device is actuated, to a second level, when the indicating device is de-actuated.

The invention may be better understood by reference to the detailed description which follows and to the drawing.

BRIEF DESCRIPTION OF THE DRAWING

The drawing is a schematic electrical diagram of a fuel economy indicating circuit for a motor vehicle.

DETAILED DESCRIPTION

The inventors have found that for most purposes an adequate indication of relative fuel economy being achieved by the engine of a motor vehicle may be obtained by observation of the angular velocity of a component of the drive train of the motor vehicle in combination with observation of the angular acceleration of such drive train component or another drive train component.

The typical motor vehicle drive train includes an internal combustion engine, a transmission having an input shaft coupled to the crank shaft of the engine and an output shaft, and means for coupling the transmission output shaft to the driven wheels of the motor vehicle. Specifically, the inventors have found that the angular velocity and acceleration of one or more vehicle drive train components may be combined according to a predetermined algebraic function that defines a threshold level above which poor fuel economy is likely to be achieved and below which reasonable fuel economy is likely. For example, this algebraic function may have the general form $A = -MV + N$ where $A$ is the angular acceleration of a drive train component, $V$ is its angular velocity and $M$ and $N$ are constants. This equation is that of a straight line, although a linear function of this type is not necessarily required or even most desirable. Rather, hyperbolic or other higher order function may be more desirable for providing true indications of fuel economy. The exact function required for indicating best operation to achieve maximum fuel economy depends upon the characteristics of the engine being monitored and the vehicle in which the engine is installed.

Preferably, the fuel economy indicating circuit utilizes angular velocity and acceleration of the engine crank shaft to establish fuel economy indications. The output shaft of the transmission may also be utilized to provide this information.

With reference now to the drawing, there is shown a fuel economy indicating circuit for use in a motor vehicle having a spark ignition internal combustion engine. The circuit, generally designated by the numeral 10, includes a DC source of electrical energy 12, which may be a conventional 12-volt storage battery, having its positive terminal connected to a conventional vehicle ignition switch 14 and having its negative terminal connected to a ground lead 16. The pole of the ignition switch 14 that is remote from the battery 12 is connected by a lead 18 to a junction 20. Connected in series between junction 20 and ground lead 16 are a conventional ignition system balast resistor 22, an ignition coil primary winding 24 and switch means 28 connected between a junction 26 and the ground lead 16. The switch means 28 is operated in synchronism with the crankshaft of the engine and may be driven by a rotating cam 30 or the like. The switch means 28 may be a conventional set of ignition system breaker points operated by an engine system distributor driven by the engine camshaft. Alternatively, the switch means 28 may be a solid state switch conventionally included in a solid state or breakerless ignition system. Of course, other electrical means may be utilized to provide a signal at junction 26 which has a frequency proportional to the angular velocity of the engine crankshaft. The ignition coil secondary winding is indicated at 32 and a spark gap is indicated at 34.

When the ignition switch 14 is closed, battery positive voltage appears at junction 20. A voltage divider is formed by a resistor 36 having one of its terminals connected to the junction 20 and having its other terminal connected to the cathode of a zener diode 38 whose anode is connected to ground lead 16. This provides a regulated preferably 10-volt supply voltage on a lead 40.

A resistor 42 has one of its leads connected to the junction 26 and has its other lead connected to a junction 44 formed between the cathode of a zener diode 46 and one terminal of a resistor 48. The anode of the zener diode is connected to ground lead 16 and preferably is of 10 volts reverse breakdown voltage. The right-hand lead of the resistor 48 is connected through an input resistor 50 to the inverting input of an operational amplifier 52.

Preferably, the operational amplifier 52, and also amplifiers 54 and 56 hereinafter described, are each one quarter of a Motorola Semiconductor Products inc. type MC3401P amplifier package. This monolithic quad operational amplifier integrated circuit package is quite inexpensive and operates on the principle sometimes referred to as "current mirror" amplification. This amplifier type has a high open-loop gain, and, in a closed-loop configuration, operates such that the current entering its inverting input is equal to the current entering its noninverting input. In closed-loop operation, the amplifier output voltage adjusts itself as necessary to maintain this balance.

A resistor 58 is connected to the junction formed between resistors 48 and 50 and to the regulated voltage supply lead 40. A voltage divider is formed by resistors 60 and 62 connected in series between voltage supply lead 40 and ground lead 16. The junction between resistors 60 and 62 is connected through an input resistor 64 to the noninverting input of the amplifier 52.

The output lead 66 of the amplifier 52 is coupled to ground through a resistor 68 and is coupled through a capacitor 70 to the junction formed between one terminal of a resistor 72, whose other terminal is connected to ground lead 16, and to the cathode of a blocking diode 74. The anode of diode 74 is connected through an input resistor 76 to the inverting input of an amplifier 54. Connected between the output lead 78 of this amplifier and its inverting input is the parallel-connected combination of a resistor 80 and a capacitor 82.

In the operation of the circuitry thus far described, with the ignition switch 14 closed and the engine of the motor vehicle running, the switching means 28 is opened and closed at a frequency proportional to the angular velocity of the engine crankshaft. Accordingly, the voltage at junction 26 alternates between about ground potential and the supply voltage plus the inductive effect produced by the ignition coil. This variable voltage at junction 26 is applied to the circuitry including resistor 42 and zener diode 46. The zener diode has the effect of cutting off voltages above, for example, 10 volts so that the signal at junction 44 is variable in the similar manner as the signal at junction 26, but differs in that its maximum value is limited.

The variable signal at junction 44, which has a frequency proportional to engine crankshaft velocity, is applied through the resistors 48 and 50 to the inverting input of the amplifier 52, which is operating in an open-loop configuration. The voltage divider formed by resistors 60 and 62 with the circuit values indicated, provides at the junction of these resistors a voltage equal to half of the potential of voltage supply lead 40. This potential causes a current to flow through the input resistor 64 into the noninverting input of amplifier 52. The excursions of the signal at junction 44 cause the signal on output lead 66 of the amplifier to alternate between a voltage slightly above ground potential and a voltage slightly below that of regulated supply lead 40. Due to the high gain of the amplifier 52, the rise and fall times between these voltage levels is rapid and the voltage signal at output lead 66 is essentially a square wave having a frequency proportional to the angular velocity of the engine's crankshaft and a duty cycle determined by the operation of switch means 28, that is, by the ignition system dwell time.

The function of the resistors 68 and 72 and the capacitor 70 interconnecting them is to filter the square wave pulses on output lead 66 to provide pulses at junction 73 that have a corresponding frequency proportional to crankshaft angular velocity, but which pulses at junction 73 have substantially constant area over the range of engine speeds.

Operational amplifier 54 functions as a frequency-to-voltage converter that sums the pulses occurring at junction 73 to produce a voltage on its output lead 78 that is proportional to crankshaft angular velocity. During engine operation, the voltage on amplifier 54 output lead 78 has a DC component proportional to crankshaft angular velocity, but also has some residual ripple noise resulting from the circuitry utilized. Other circuitry for generating an electrical signal proportional to the angular velocity of a vehicle drive train component may be utilized.

The regulated supply voltage on lead 40 is applied through the series combination of a resistor 86, a variable resistor 88 and a resistor 90 to the noninverting input of an amplifier 56. The output lead 78 of amplifier 54 is applied to a junction 92. Between the junction 92 and a junction 94, a capacitor 96 and a resistor 98 are connected in parallel. A resistor 100 is connected between junction 94 and the inverting input of the amplifier 54. A feedback circuit, including parallel-connected resistor 104 and capacitor 106, is connected between the output 102 of the amplifier 56 and its inverting input. A resistor 108 is connected between output lead 102 and ground lead 16.

The output lead 102 of amplifier 56 is connected through a current limiting resistor 110 to the base of a transistor 112 whose emitter is connected to ground lead 16. The collector lead 114 of the transistor 112 is connected to a preferably green indicating lamp 116, which, in turn, is connected by a lead 117 to the positive unregulated voltage supply lead 18. A hysteresis or threshold-level shifting circuit is formed by a resistor 118 connected in series with a capacitor 120, both of these series-connected components being connected in parallel with a resistor 122. This parallel hysteresis circuit is connected between collector lead 114 and the inverting input of amplifier 56.

The collector lead 114 of the transistor 112 also is connected through a current limiting resistor 124 to the base of a transistor 126. The emitter of the transistor 126 is connected to ground lead 16 and its collector is connected through a preferably red indicating lamp 128 to the lead 117.

In the operation of the circuitry described in the preceding paragraphs, the voltage on regulated supply lead 40 provides a bias current through resistors 86, 88 and 90 to the noninverting input of the amplifier 56. The current flowing into the inverting input of the amplifier 56, mirrors the bias current flowing into its noninverting input. The current flowing into the noninverting input is fixed, and the current flowing into the inverting input includes the current flowing through the resistor 100, the current flowing through the feedback circuit including resistor 104 and capacitor 106 and the current flowing through the hysteresis or threshold-level shifting circuitry including resistor 118, capacitor 120 and resistor 122. The voltage on output lead 102 of the amplifier 56 adjusts itself as necessary to provide a current flowing into the inverting input of amplifier 56 that mirrors the bias current flowing into its noninverting input.

The voltage at junction 92 is a first electrical signal that is proportional to the angular velocity of the engine crankshaft. Capacitor 96 has a current flowing through it which is approximately equal to the product of this capacitance and the time rate of change of the voltage at junction 92. This current through the capacitor 96 constitutes a second electrical signal proportional to engine-crankshaft angular acceleration, the time derivative of crankshaft angular velocity. Since the resistor 98 is connected in parallel with the capacitor 96, the second electrical signal proportional to crankshaft angular acceleration is combined with the signal proportional to crankshaft angular velocity to produce a third electrical signal, the current flowing through the resistor 100 into the inverting input of the amplifier 56, that is a function of both of these crankshaft, position-related parameters.

When the current flowing through the resistor 100 into the inverting input of the amplifier 56 is of a low magnitude, then the output voltage of the amplifier 56 is high enough to render the transistor 112 conductive in its collector-emitter output circuit. This causes the green indicating lamp 116 to be illuminated thereby to provide the vehicle operator with an indication that the vehicle engine is operating under conditions likely to provide good fuel economy.

When the transistor 112 conductive, its collector lead 114 is at substantially ground potential and the hysteresis circuit including components 118, 120 and 122 provides a shunt path for some of the current flowing through the resistor 100. The action of this hysteresis circuit, together with the bias current flowing into the noninverting input of the amplifier 56, established a threshold level for operation of the amplifier. When the magnitude of the current flowing through the resistor 100, a function of crankshaft angular velocity and acceleration, exceeds this threshold level, the amplifier output voltage on output lead 102 decreases to a point whereat the transistor 112 is rendered nonconductive in its collector-emitter output circuit. As a result, the green indicating lamp 116 is extinguished and the voltage on collector lead 114 increases to the level of the supply voltage on lead 117. The resulting change in current flow through the hysteresis circuit results in a shifting of the threshold level of operation for the amplifier 56. This prevents oscillations in the actuation of the indicating lamps.

When the transistor 112 is rendered nonconductive and the voltage on its collector lead 114 increases, the transistor 126 is rendered conductive in its collector-emitter output circuit resulting in illumination of the red indicating lamp 128 to indicate to the vehicle operator that the engine or vehicle is operating under conditions likely to produce poor fuel economy.

As was previously stated, the voltage on the output lead 78 of the amplifier 54 includes some noise. The primary function of the capacitor 106 is to limit the gain of the amplifier 56 with respect to such noise, which is of relatively high frequency compared to the variation of the DC voltage component on output lead 78 which variation is a function of engine acceleration. Resistor 100 also aids in this respect. Capacitor 120 aids in the rapid transition of the switching conditions of transistor 112.

The invention thus described in detail utilizes the time derivatives of crankshaft angular position to produce indications of engine fuel economy in a motor vehicle. The inventors also have utilized circuitry indicative of transmission output shaft angular velocity and acceleration to provide fuel economy indications with good results. Various other modifications of the circuitry or its function within the scope and spirit of the invention will be apparent to those of skill in the art.

Based upon the foregoing description of the invention, what is claimed is:

1. In combination with a motor vehicle having a drive train including an engine, a fuel economy indicating circuit for indicating to the operator of said vehicle that said engine is operating under conditions likely to produce poor fuel economy, said fuel economy indicating circuit comprising:

first circuit means for generating a first electrical signal, said first electrical signal having a magnitude proportional to the angular velocity of a component of said vehicle drive train;

second circuit means for generating a second electrical signal, said second electrical signal having a magnitude proportional to the angular acceleration of a component of said vehicle drive train;

third circuit means for combining said first and second electrical signals, thereby, to generate a third electrical signal, said third electrical signal having a magnitude that is a function of the magnitudes of said first and second electrical signals;

an electrically-actuable indicating device positioned in or on said vehicle for ready observation by an operator of said vehicle; and fourth circuit means, responsive to said third electrical signal, for actuating said indicating device when the magnitude of said third electrical signal reaches a predetermined threshold level.

2. A fuel economy indicating circuit according to claim 1, wherein said fourth circuit means for actuating said indicating device comprises an amplifier circuit having a first input coupled to said third circuit means, a second input and an output, said output being coupled to said indicating device for the control of its actuation, and circuit means, coupled to said amplifier circuit second input, for establishing said threshold level.

3. A fuel economy indicating circuit according to claim 1 which further includes hysteresis circuit means, coupled between said indicating device and said fourth-circuit means, for shifting said threshold level from a first level when said indicating device is actuated to a second level when said indicating device is de-actuated.

4. A fuel economy indicating circuit according to claim 1, wherein said first circuit means comprises means for generating a voltage, said voltage being said first electrical signal.

5. A fuel economy indicating circuit according to claim 4, wherein said second circuit means comprises circuit means for generating a current, said current being said second electrical signal and being proportional to the time rate of change of said voltage.

6. A fuel economy indicating circuit according to Claim 5, wherein said third circuit means comprises means for generating a second current, said second current being said third electrical signal and a function of both said voltage and said first-mentioned current.

7. A fuel economy indicating circuit according to claim 6 wherein said second circuit means comprises a capacitor and wherein said third circuit means comprises a resistor connected in parallel with said capacitor, said parallel-connected resistor and capacitor being coupled between said first and fourth circuit means.

8. A fuel economy indicating circuit according to claim 7, which includes a second resistor connected in series with said parallel-connected capacitor and first-mentioned resistor.

9. A fuel economy indicating circuit according to claim 2, wherein said first circuit means comprises means for generating a voltage, said voltage being said first electrical signal.

10. A fuel economy indicating circuit according to claim 9, wherein said second circuit means comprises circuit means for generating a current, said current being said second electrical signal and being proportional to the time rate of change of said voltage.

11. A fuel economy indicating circuit according to claim 10, wherein said third circuit means comprises means for generating a second current, said second current being said third electrical signal and a function of said voltage and said firstmentioned current.

12. A fuel economy indicating circuit according to claim 11 wherein said second circuit means comprises a capacitor and said third circuit means comprises a resistor connected in parallel with said capacitor, said parallel-connected resistor and capacitor being coupled between said first and fourth circuit means.

13. A fuel economy indicating circuit according to claim 12, which includes a second resistor connected in series with said parallel-connected capacitor and first mentioned resistor.

14. A fuel economy indicating circuit according to claim 2, which further includes hysteresis circuit means, coupled between said indicating device and said amplifier first input, for shifting said threshold level from a first level when said indicating device is actuated to a second level when said indicating device is de-actuated.

* * * * *